(12) United States Patent
Pan et al.

(10) Patent No.: US 10,243,350 B2
(45) Date of Patent: Mar. 26, 2019

(54) PROTECTION CIRCUIT AND GROUND FAULT CIRCUIT INTERRUPTER

(71) Applicant: Ze Chen, Yueqing, Zhejiang Province (CN)

(72) Inventors: Xincheng Pan, Huizhou (CN); Tingting Wu, Wenzhou (CN); Ye Zhang, Huizhou (CN)

(73) Assignee: Ze Chen, Yueqing (CN)

( * ) Notice: Subject to any disclaimer, the term of this patent is extended or adjusted under 35 U.S.C. 154(b) by 447 days.

(21) Appl. No.: 15/004,566

(22) Filed: Jan. 22, 2016

(65) Prior Publication Data

US 2016/0365720 A1    Dec. 15, 2016

(30) Foreign Application Priority Data

Jun. 11, 2015 (CN) .......................... 2015 1 0320269
Sep. 17, 2015 (CN) .......................... 2015 1 0594333
Jan. 4, 2016 (CN) .......................... 2016 1 0006570

(51) Int. Cl.
H02H 3/33    (2006.01)

(52) U.S. Cl.
CPC ............ *H02H 3/334* (2013.01); *H02H 3/335* (2013.01); *H02H 3/338* (2013.01)

(58) Field of Classification Search
CPC ............................................. H02H 3/33–3/38
See application file for complete search history.

(56) References Cited

U.S. PATENT DOCUMENTS

| 4,001,652 | A |   | 1/1977  | Klein |
|-----------|---|---|---------|-------|
| 4,901,183 | A | * | 2/1990  | Lee ........................ H02H 9/042 361/111 |
| 5,198,955 | A | * | 3/1993  | Willner ................. H01R 13/713 361/42 |
| 5,293,522 | A | * | 3/1994  | Fello ....................... H02H 3/334 335/18 |
| 5,541,800 | A |   | 7/1996  | Misencik |
| 5,963,406 | A | * | 10/1999 | Neiger .................. H02H 1/0015 361/42 |
| 6,002,563 | A | * | 12/1999 | Esakoff .................. H05B 39/00 361/115 |
| 6,052,265 | A | * | 4/2000  | Zaretsky ................ H02H 3/335 340/638 |

(Continued)

*Primary Examiner* — Ronald W Leja
*Assistant Examiner* — Christopher J Clark
(74) *Attorney, Agent, or Firm* — Mei & Mark LLP

(57) ABSTRACT

The present invention relates to a protection circuit and a ground fault circuit interrupter. A protection circuit may include a power supply circuit, a ground fault detection circuit, a signal amplifying and shaping circuit, a microcontroller control circuit, a power supply detection and indicator circuit, a tripping mechanism control circuit, and a reverse grounding detection and execution circuit. The microcontroller control includes a microcontroller, a first capacitor, and a reset filter circuit. The reset filter circuit comprises a reset IC, a second capacitor, and another capacitor. A ground fault circuit interrupter may comprise an interrupter body with a protection circuit in the interrupter body. The practice of the present disclosure may address installation safety risks of conventional ground fault circuit interrupters and arc fault circuit interrupter and improve the safety of ground fault circuit interrupters.

20 Claims, 5 Drawing Sheets

(56) References Cited

U.S. PATENT DOCUMENTS

| | | | |
|---|---|---|---|
| 6,828,886 B2 | 12/2004 | Germain | |
| 6,900,972 B1* | 5/2005 | Chan | H01H 83/04 361/111 |
| 6,954,125 B2 | 10/2005 | Wu | |
| 7,253,629 B1* | 8/2007 | Richards | G01R 31/3277 324/424 |
| 7,408,432 B2* | 8/2008 | Shi | H01H 83/04 335/17 |
| 7,672,097 B1* | 3/2010 | Striblen | H01H 83/04 361/42 |
| 7,889,466 B2 | 2/2011 | Chan | |
| 7,936,238 B1 | 5/2011 | Weeks | |
| 8,085,516 B1* | 12/2011 | Armstrong | H02H 3/335 361/42 |
| 8,335,062 B2* | 12/2012 | Haines | H02H 3/00 320/109 |
| 8,462,006 B2 | 6/2013 | Chen | |
| 8,779,875 B2 | 7/2014 | Chen | |
| 8,847,712 B2* | 9/2014 | Chen | H01H 83/04 335/18 |
| 8,861,146 B2* | 10/2014 | McMahon | H01H 47/22 361/42 |
| 9,709,626 B2* | 7/2017 | Ostrovsky | G01R 31/2884 |
| 2002/0135959 A1* | 9/2002 | Germain | H01H 83/04 361/42 |
| 2002/0181175 A1* | 12/2002 | Baldwin | H02H 3/335 361/42 |
| 2004/0070474 A1 | 4/2004 | Wu | |
| 2005/0063109 A1 | 3/2005 | Baldwin | |
| 2007/0030608 A1 | 2/2007 | Baldwin | |
| 2007/0146947 A1* | 6/2007 | Zhang | H02H 3/335 361/42 |
| 2007/0279814 A1 | 12/2007 | Bonilla | |
| 2008/0002314 A1* | 1/2008 | Batko | H02H 3/04 361/42 |
| 2008/0007879 A1* | 1/2008 | Zaretsky | H02H 3/335 361/42 |
| 2008/0022153 A1* | 1/2008 | Wang | H02H 3/335 714/30 |
| 2009/0128264 A1* | 5/2009 | DiSalvo | H01H 83/04 335/6 |
| 2009/0180221 A1* | 7/2009 | Chen | H02H 3/334 361/42 |
| 2010/0134306 A1* | 6/2010 | Zeng | H02H 3/334 340/638 |
| 2010/0254049 A1* | 10/2010 | Yue | H01H 83/04 361/42 |
| 2010/0259347 A1 | 10/2010 | Ziegler | |
| 2010/0295568 A1* | 11/2010 | Ostrovsky | G01R 31/3277 324/750.3 |
| 2011/0216451 A1* | 9/2011 | Haines | B60L 3/0069 361/42 |
| 2012/0154972 A1* | 6/2012 | McMahon | H01H 47/22 361/187 |
| 2012/0250193 A1* | 10/2012 | Kevelos | H02H 3/044 361/45 |
| 2013/0038968 A1* | 2/2013 | Chen | H01H 83/04 361/42 |
| 2013/0241678 A1* | 9/2013 | Bonasia | H01H 83/04 335/18 |
| 2013/0278361 A1* | 10/2013 | Weeks | H05K 5/02 335/6 |
| 2014/0177111 A1* | 6/2014 | Wang | H02H 3/05 361/42 |
| 2014/0285939 A1* | 9/2014 | Chen | H02H 3/335 361/115 |
| 2014/0347768 A1* | 11/2014 | Batko | G01R 31/025 361/42 |
| 2015/0280430 A1* | 10/2015 | Huang | H02H 3/044 361/42 |
| 2015/0309105 A1* | 10/2015 | Ostrovsky | G01R 31/025 324/509 |
| 2016/0172839 A1* | 6/2016 | Pan | H02H 3/16 361/42 |
| 2016/0181785 A1* | 6/2016 | Simonin | H02H 3/335 361/94 |
| 2017/0047726 A1* | 2/2017 | Pan | H02H 11/002 |
| 2017/0322254 A1* | 11/2017 | Ostrovsky | G01R 31/3277 |
| 2017/0331276 A1* | 11/2017 | McMahon | H02H 3/335 |

* cited by examiner

PROTECTION CIRCUIT AND GROUND FAULT CIRCUIT INTERRUPTER

CROSS-REFERENCE TO RELATED APPLICATION

This application claims priority to and incorporates herein Chinese application No. 201510320269.2 filed on Jun. 11, 2015, Chinese application No. 201510594333.6 filed on Sep. 17, 2015, and Chinese application No. 201610006570.0 filed on Jan. 4, 2016.

TECHNICAL FIELD

The invention relates to a protection circuit, and also relates to a ground fault circuit interrupter using the circuit.

BACKGROUND

The ground fault circuit interrupter (GFCI) is a leakage protection product widely used in countries/regions such as the United States, Canada, North America, and South America. It plays an important role in protecting safety of lives and property of the people in the aforementioned areas. An existing GFCI generally comprises a base, a cover with receptacle jacks, an electromagnetic tripping mechanism, a contact assembly, a grounding assembly, a power input connection assembly, a power output connection assembly, and other components. Its circuits include a power supply circuit, a ground fault detection circuit, a signal amplifying circuit, a power supply indicator circuit, and a tripping mechanism driving circuit. The electromagnetic tripping mechanism is controlled by the ground fault detection circuit. The GFCI can supply power to the load through the receptacle jacks in the cover, and can also provide power to the load connected thereof through the power output connection assembly. US patent application publications with the numbers US2013021120A1 and US2013038968A1 disclose the above conventional GFCI.

Due to existing restrictions on circuit design, the conventional GFCI suffers the following safety risks:

First, the conventional GFCI circuit lacks comprehensive reverse connection detection function. When an installer mistakenly makes a reverse connection of the power supply lines, the GFCI may not realize the function of leakage protection and fail to provide of ground fault protection. Accordingly, the conventional GFCI suffers installation risks, and it is difficult for a user to notice reverse connection of power supply lines.

Second, in a working state, the conventional GFCI carries out tests through a manual detection circuit. During use of a conventional GFCI after installation of the product, if a user wants to know whether the GFCI product is in a normal working state, he needs to press a button of the manual detection circuit to find out. Such a design requires the user to regularly make manual tests of the GFCI products. On one hand, this imposes a heavier burden on the user; on the other hand, when the conventional GFCI product is damaged at work, the user may not notice it. After failure occurs in the conventional GFCI product, there are safety risks before the user notices that the GFCI product failed and replaces it.

Third, the power supply detection and indicator of the conventional GFCI has a simple structure. It can only indicate whether the GFCI product is energized. It cannot detect and indicate whether the GFCI product is in a normal working state, and thus fails to meet the fault detection requirement of the GFCI product.

SUMMARY

A first objective of the present disclosure is to provide a protection circuit to address installation safety risks of conventional ground fault circuit interrupters and arc fault circuit interrupters and to improve the safety of ground fault circuit interrupters. A second objective of the present disclosure is to provide a ground fault circuit interrupter to address installation safety risks of conventional ground fault circuit interrupters and to improve the safety of ground fault circuit interrupters.

In one example, a protection circuit is provided. The protection circuit includes a power supply circuit, a ground fault detection circuit, a signal amplifying and shaping circuit, a microcontroller control circuit, a power supply detection and indicator circuit, a tripping mechanism control circuit, and a reverse connection detection and execution circuit. The microcontroller control includes a microcontroller, a first capacitor, and a reset filter circuit. The reset filter circuit includes a reset IC, a second capacitor, and a nineteenth capacitor. A first pin of the reset IC is connected to a VCC of the protection circuit, a second pin of the reset IC is connected to a reset terminal of the microcontroller, and a third pin of the reset IC is grounded. The second capacitor is connected between the second and third pins of the reset IC. The first capacitor is connected between a power supply terminal of the microcontroller and a ground. The nineteenth capacitor is connected between the first pin of the reset IC and the ground. The power supply terminal of the microcontroller is connected to the VCC, and a ground terminal of the microcontroller is grounded.

In another example, the microcontroller control circuit carries out power-on self-test and reset for the protection circuit. The ground fault detection circuit includes a leakage detection circuit and a grounding detection circuit, which detect leakage failure and grounding failure, respectively. The signal amplifying and shaping circuit includes a leakage detection and signal amplifying circuit and a signal shaping circuit, which are connected to each other and carry out amplifying and shaping on a leakage detection signal. The power supply detection and indicator circuit includes a power supply detection circuit and an indicator circuit, which are connected to each other and carry out detection and displaying of a power status. The reverse connection detection and execution circuit comprises a reverse connection detection control circuit and a detection and execution circuit, which are connected to each other and carry out detecting of a reverse connection of the protection circuit in a reset state and in a tripping state.

In yet another example, the power supply circuit includes a power supply filter circuit, a first rectifier circuit, a first filter and regulator circuit, and a second filter and regulator circuit. The tripping mechanism control circuit includes a reset switch, which is provided on a live line and a neutral line of the protection circuit, and a control circuit that controls the reset switch. The first filter and regulator circuit is connected to the ground fault detection circuit. The second filter and regulator circuit is connected to the signal amplifying and shaping circuit and the microcontroller control circuit. The ground fault detection circuit, the signal amplifying and shaping circuit, and the microcontroller control circuit are connected in sequence. The microcontroller control circuit is connected to the power supply detection and indicator circuit and the tripping mechanism control circuit.

In yet another example, the power supply filter circuit is connected to an input terminal of the live line. A first input terminal and a second input terminal of the first rectifier circuit are respectively connected to an input terminal of the neutral line and an output terminal of the power supply filter circuit. A first pin of the first rectifier circuit is grounded. A second pin of the first rectifier circuit is connected to the both the first filter and regulator circuit and the second filter and regulator circuit. The reset switch is positioned on the live line and the neutral line after the grounding detection circuit.

In yet another example, the power supply filter circuit comprises an inductor coil. The first filter and regulator circuit comprises a first resistor, a third capacitor, and an internal regulator circuit of a first pin of a leakage signal processing IC. The first resistor is connected between the second pin of the first rectifier circuit and the first pin of the leakage signal processing IC, and the third capacitor is connected between the first pin of the leakage signal processing IC and the ground. The second filter and regulator circuit comprises a second resistor, a stabilivolt, a fourth capacitor, a fifth capacitor, a sixth capacitor, a seventh capacitor, a power supply IC, an eighth capacitor, a ninth capacitor, a tenth capacitor, and an eleventh capacitor. The second resistor is connected between the second pin of the first rectifier circuit and a first pin of the power supply IC. A positive electrode of the stabilivolt is grounded and a negative electrode of the stabilivolt connected to first pin of the power supply IC. The fourth, fifth, sixth, and seventh capacitors are connected in parallel between the first pin of power supply IC and the ground. The eighth, ninth, tenth, and eleventh capacitors are connected in parallel between a second pin of the power supply IC and the ground. The second pin of the power supply IC is connected to the VCC and the third pin of the power supply IC is grounded. The leakage detection circuit comprises a first current coupling induction coil and a twelfth capacitor. The twelfth capacitor is connected between a first terminal and a second terminal of the first current coupling induction coil. The first and second terminals of the first current coupling induction coil are connected to the second and third pins of the leakage signal processing IC, respectively. The live and neutral lines pass through the first current coupling induction coil. The grounding detection circuit comprises a second current coupling induction coil and a thirteenth capacitor. The thirteenth capacitor is connected to a first terminal and a second terminal of the second current coupling induction coil. The first and second terminals of the second current coupling induction coil are grounded and connected to the leakage detection and signal amplifying circuit, respectively. The live and neutral lines pass through the second current coupling induction coil.

In yet another example, the leakage detection and signal amplifying circuit comprises the leakage signal processing IC, a fourteenth capacitor, a third resistor, and a fifteenth capacitor. The fourteenth capacitor, the third resistor, and the fifteenth capacitor are sequentially connected in series between the first current coupling induction coil and the second current coupling induction coil. The third resistor is connected between a fourth pin and a fifth pin of the leakage signal processing IC. The signal shaping circuit comprises an internal comparison shaping pin of the microcontroller, a sixteenth capacitor, a seventeenth capacitor, a fourth resistor, a fifth resistor, a sixth resistor, an eighteenth capacitor, and a twentieth capacitor. The sixteenth and seventeenth capacitors are connected in parallel between the ground and a sixth pin of the leakage signal processing IC. The fourth resistor is connected between a sixth pin of the leakage signal processing IC and a control signal input terminal of the microcontroller. The fifth and sixth resistors are sequentially connected in series between the VCC and the ground. A connection point of the fifth and sixth resistors is connected to the internal comparison shaping terminal of the microcontroller. The eighteenth capacitor and the sixth resistor are connected in parallel between the internal comparison shaping terminal of the microcontroller and the ground. The twentieth capacitor is connected between two pins of the microcontroller and the ground. The power supply detection circuit includes the first rectifier circuit, the first resistor, the internal regulator circuit, the third capacitor, an eighth resistor, a ninth resistor, a twenty-first capacitor, and the microcontroller. The eighth resistor is connected between the first pin of the leakage signal processing IC and the ninth resistor, which is grounded. A connection point of the eighth and ninth resistors is connected to a detection terminal of the microcontroller. The twenty-first capacitor is connected between the ground and the detection terminal of the microcontroller. The indicator circuit includes a normal signal output terminal and a fault signal output terminal of the microcontroller, a tenth resistor, an eleventh resistor, a red LED, and a green LED. The tenth resistor is connected between the fault signal output terminal of the microcontroller and a negative electrode of the red LED. The eleventh resistor connected between the normal signal output terminal of the microcontroller and a negative electrode of the green LED. A positive electrode of the red LED and a positive electrode of the green LED are connected to the VCC.

In yet another example, the control circuit of the tripping mechanism control circuit comprises the microcontroller, a twenty-second capacitor, a twelfth resistor, a first one-way silicon controlled rectifier, a twenty-third capacitor, a thirteenth resistor, and a relay that interfaces with the inductor coil. The twenty-second capacitor is connected between a first triggering terminal of the microcontroller and the ground. The twelfth resistor is connected between the first triggering terminal of the microcontroller and a control electrode of the first one-way silicon controlled rectifier. An anode of the first one-way silicon controlled rectifier is connected to a connection point where the inductor coil is connected to the second input terminal of the first rectifier circuit. A cathode of the first one-way silicon controlled rectifier is grounded. The twenty-third capacitor and the thirteenth resistor are connected in series between the anode of the first one-way silicon controlled rectifier and the ground. The relay drives the reset switch through a mechanical link. The reverse connection detection control circuit comprises the microcontroller, a twenty-fourth capacitor, a fourteenth resistor, and a heavy and light current isolation optocoupler. The twenty-fourth capacitor is connected between a third triggering terminal of the microcontroller and the ground. The fourteenth resistor is connected between the third triggering terminal of the microcontroller and a triggering control terminal of the heavy and light current isolation optocoupler. A power supply terminal of the heavy and light current isolation optocoupler is connected to the VCC. A first output terminal of the heavy and light current isolation optocoupler is connected to the load output terminal of the live line. The detection and execution circuit comprises a twenty-fifth capacitor, a twenty-sixth capacitor, a normally-closed contact, a normally-open contact, a seventh resistor, a normally-closed switch, and a reverse relay. The twenty-fifth capacitor and the twenty-sixth capacitor are connected in series. The twenty-fifth capacitor is connected with the normally-closed contact, the normally-open contact, a first terminal of the reverse relay, and a second output terminal of the heavy and light current isolation optocoupler. The twenty-sixth capacitor is connected with the load output terminal of the live line. The seventh resistor is connected between a connection point between the twenty-fifth and twenty sixth capacitors and a load output terminal of the neutral line. The normally-closed switch is provided on the live and neutral lines between the load output terminals of the live and neutral lines and the reset switch. The normally-closed switch is linked with the normally-open contact. The second terminal of the reverse relay is connected to the load output terminal of the neutral line. The reverse relay drives the normally-closed switch through a mechanical link.

In yet another example, the control circuit of the tripping mechanism control circuit further includes a third one-way silicon controlled rectifier. The twelfth resistor is connected between the first triggering terminal of the microcontroller and a control electrode of the third one-way silicon controlled rectifier. An anode of the third one-way silicon controlled rectifier is connected to the connection point where the inductor coil is connected to of the second input terminal of the first rectifier circuit. A cathode of the third one-way silicon controlled rectifier is grounded.

In yet another example, the power supply circuit includes a piezoresistor and an over-current protection resistor. The piezoresistor is connected between the input terminal of the live line and the input terminal of the neutral line. The over-current protection resistor is connected between the input terminal of the live line and an input terminal of the power supply filter circuit.

In yet another example the protection circuit further includes a simulation leakage circuit. The simulation leakage circuit comprises the microcontroller, a twenty-seventh capacitor, a fifteenth resistor, a second one-way silicon controlled rectifier, and a sixteenth resistor. The twenty-seventh capacitor is connected between ground and a second triggering terminal of the microcontroller. The fifteenth resistor is connected between the second triggering terminal of the microcontroller and a control electrode of the second one-way silicon controlled rectifier. The second one-way silicon controlled rectifier and the sixteenth resistor are connected in series between the live line and the ground. The sixteenth resistor is connected between an anode of the second one-way silicon controlled rectifier and the live line next to the reset switch.

In yet another example, a ground fault circuit interrupter includes an interrupter body that includes any of the protection circuits described above.

Compared with the prior art, the disclosed protection circuits, and GFCIs that include the protection circuits, have the following beneficial effects:

First, adding a reverse connection detection and execution circuit permits the protection circuit and the ground fault circuit interrupter to automatically test whether the GFCI was installed correctly, and warn a user when the GFCI was installed incorrectly, thereby avoiding safety risks due to failures of protective functionality of the GFCI resulting from incorrect connection.

Second, including a simulation leakage circuit endows the protection circuit and the ground fault circuit interrupter with an automatic leakage detection function. The simulation leakage circuit helps ensure that a user will be promptly notified if, for example, the current leakage detection function of a ground fault circuit interrupter fails. The user will be reminded of need for timely replacement, avoiding circuit safety risks associated with delayed recognition of the failure of the ground fault circuit interrupter.

Third, the protection circuit can be used not only in a ground fault circuit interrupter but also in products such as an arc fault circuit interrupter (AFCI).

Fourth, the circuit is simple and easy to implement.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate the embodiments of the present disclosure and together with the description, serve to explain the principles of the invention.

DETAILED DESCRIPTION

References will now be made in detail to the present exemplary embodiments, examples of which are illustrated in the accompanying drawings. Wherever possible, the same reference numbers will be used throughout the drawings to refer to the same or like parts. While the description includes exemplary embodiments, other embodiments are possible, and changes may be made to the embodiments described without departing from the spirit and scope of the invention. The following detailed description does not limit the invention. Instead, the scope of the invention is defined by the appended claims and their equivalents.

Figure 3:
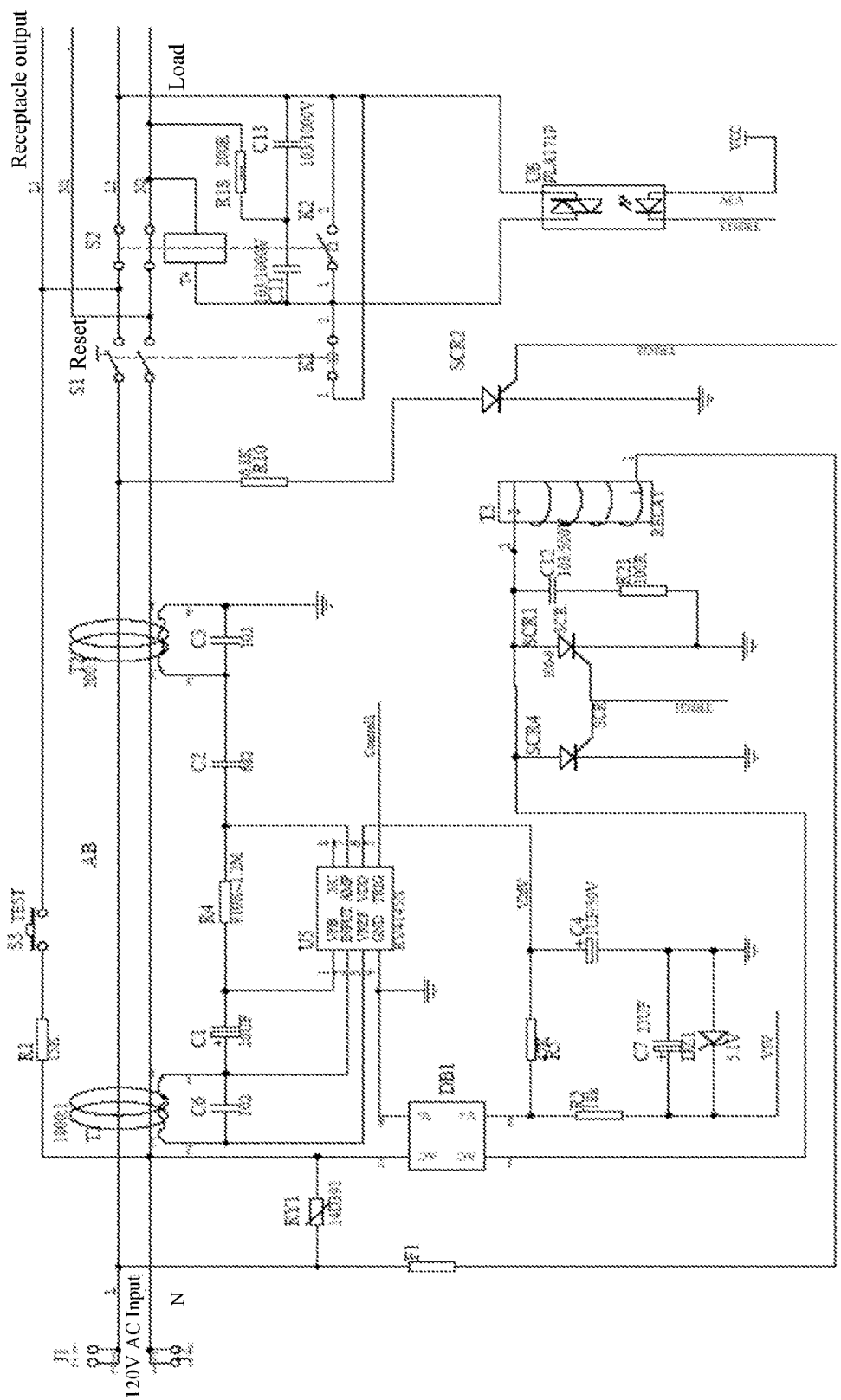
FIG. 3 is a first portion of a circuit diagram of an embodiment of a protection circuit of the present disclosure.

In the specification, the circuit symbols in the drawings are named according to the following convention: "circuit symbol_figure number." For example, a rectifier circuit DB1 in FIG. 3 is named DB1_3.

As shown in FIGS. 1, 3, 4, and 5, the protection circuit of the present disclosure comprises a power supply circuit 90, a leakage grounding detection circuit 20, a signal amplifying and shaping circuit 30, a microcontroller control circuit 10, a power supply detection and indicator circuit 60, a tripping mechanism control circuit 80, a manual detection circuit 40, a simulation leakage circuit 50, and a reverse connection detection and execution circuit 70. They are described as below.

The power supply circuit 90 comprises: a power supply filter circuit, a rectifier circuit DB1_3, a first filter and regulator circuit, and a second filter and regulator circuit. The power supply filter circuit is connected to an input terminal of live line L receiving municipal electricity. The input terminals of the rectifier circuit DB1_3 are respectively connected to an input terminal of the neutral line N receiving municipal electricity and an output terminal of the first filter circuit. The output terminal pin 4 of the rectifier circuit DB1_3 is grounded, and the output terminal pin 3 is connected to the first filter and regulator circuit and the second filter and regulator circuit, respectively.

The first filter and regulator circuit of the power supply circuit 90 is connected to the ground fault detection circuit 20. The second filter and regulator circuit of the power supply circuit 90 is connected to the signal amplifying and shaping circuit 30 and the microcontroller control circuit 10. The ground fault detection circuit 20, the signal amplifying and shaping circuit 30, and the microcontroller control circuit 10 are connected in sequence. The manual detection circuit 40 is connected to the ground fault detection circuit 20. The microcontroller control circuit 10 is respectively connected to the simulation leakage circuit 50, the power supply detection and indicator circuit 60, the reverse connection detection and execution circuit 70, and the tripping mechanism control circuit 80. The simulation leakage circuit 50 is connected to the ground fault detection circuit 20.

The ground fault detection circuit 20 comprises a leakage detection circuit and a grounding detection circuit, which detect leakage failure and grounding failure, respectively.

The signal amplifying and shaping circuit 30 comprises a leakage detection and signal amplifying circuit and a signal shaping circuit, which are connected to each other and carry out amplifying and shaping on a leakage detection signal.

The microcontroller control circuit 10 comprises a microcontroller U4_5, a filter capacitor C14_5, and a reset filter circuit. The reset filter circuit comprises a reset IC U3_5, a filter capacitor C12_5, and a filter capacitor C1_5. Pin 3 of the reset IC U3_5 is connected to a VCC terminal of the protection circuit, pin 2 of the reset IC is connected to a reset terminal (pin 4) of the microcontroller U4_5, and pin 1 is grounded. The filter capacitor C12_5 is respectively connected to pin 1 and pin 2 of the reset IC U3_5. One terminal of the filter capacitor C1_5 is connected to pin 3 of the reset IC U3_5, and the other terminal is grounded. One terminal of the filter capacitor C14_5 is connected to a power supply terminal (pin 1) of the microcontroller U4_5, and the other terminal is grounded. A power supply terminal (pin 1) of the microcontroller U4_5 is connected to the VCC terminal of the protection circuit, its ground terminal (pin 14) is grounded. The microcontroller control circuit 10 carries out power-on self-test and reset of the protection circuit.

The power supply detection and indicator circuit 60 comprises a power supply detection circuit and an indicator circuit, which are connected to each other and carry out detection and displaying of the power status, respectively.

The tripping mechanism control circuit 80 comprises: a reset switch S1_3 provided on the live line L and the neutral line N of the protection circuit and its control circuit. The position where the reset switch S1_3 is provided on the live line L and the neutral line N of the protection circuit is located after the grounding detection circuit. The control circuit carries out controlling of the reset switch S1_3.

The manual detection circuit 40 comprises a current limiting resistor R1_3 and a press switch S3_3. The current limiting resistor R1_3 and the press switch S3_3 are connected in series, with one terminal is connected to the input terminal of the neutral line N of the protection circuit, and the other terminal is connected to the receptacle output of the live line.

Figure 1:
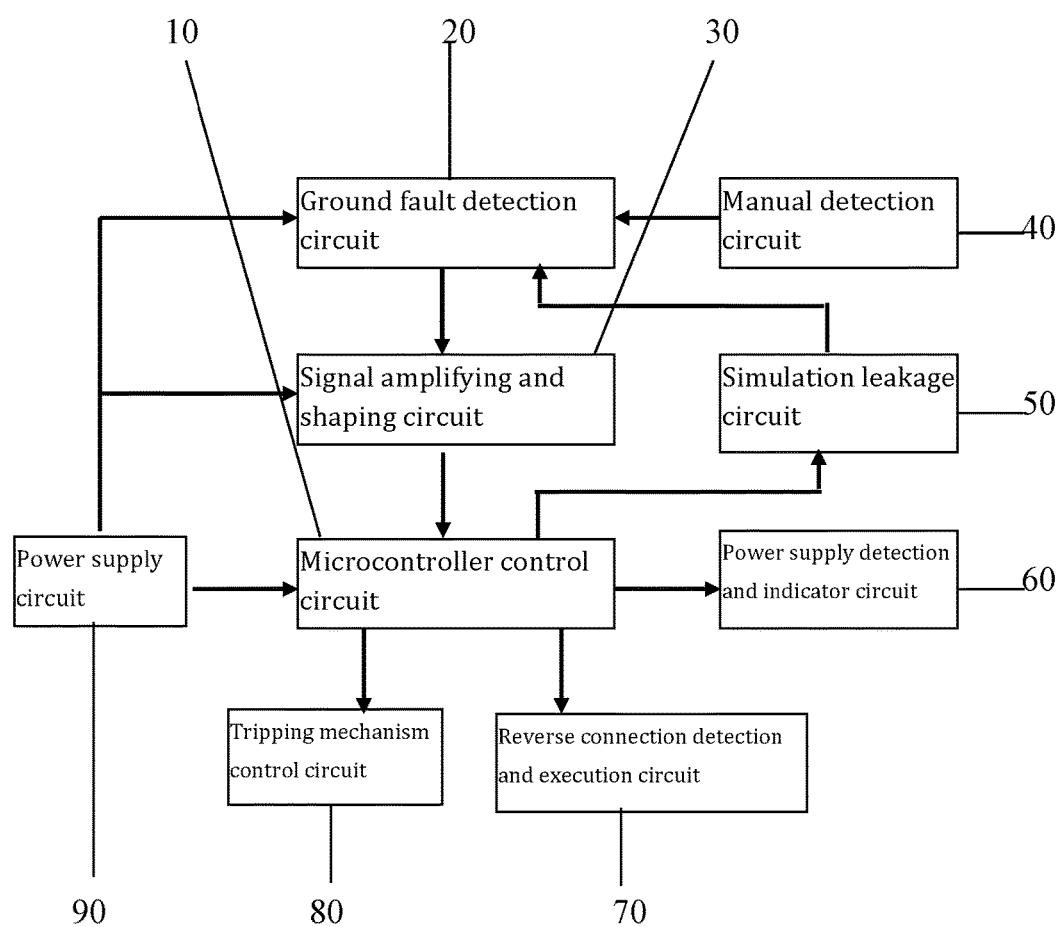
FIG. 1 is a block diagram of an embodiment of a protection circuit of the present disclosure.
Figure 2:
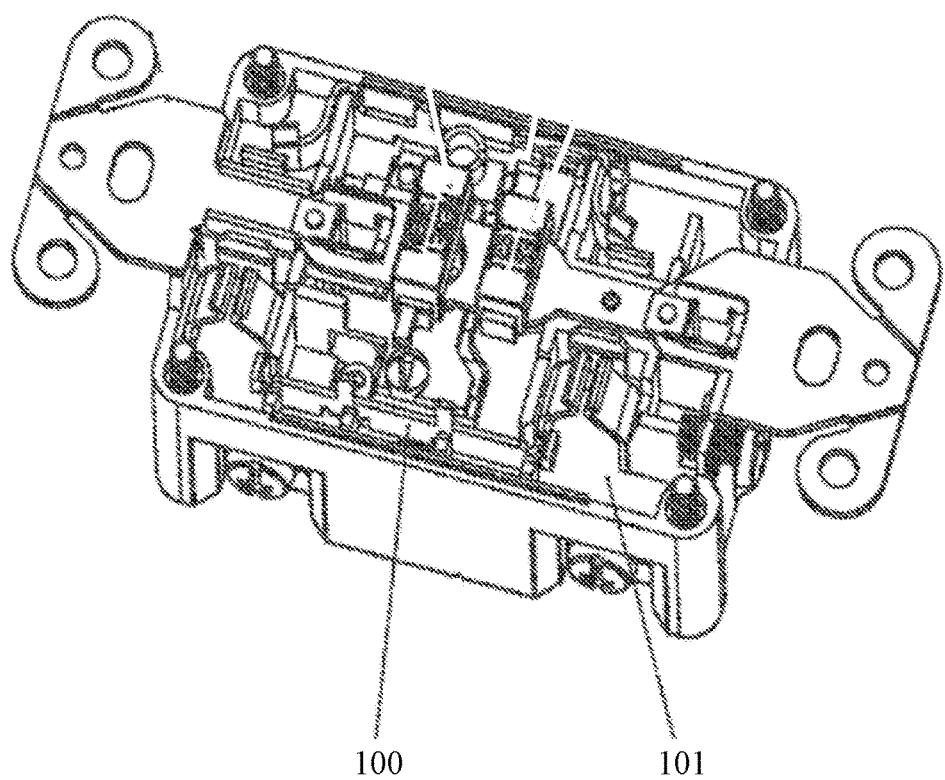
FIG. 2 is a perspective view of an embodiment of a ground fault circuit interrupter of the present disclosure.

In other embodiments, as shown in FIG. 2, the manual detection circuit 40 may be omitted, and the objectives of the present disclosure may still be achieved.

Figure 5:
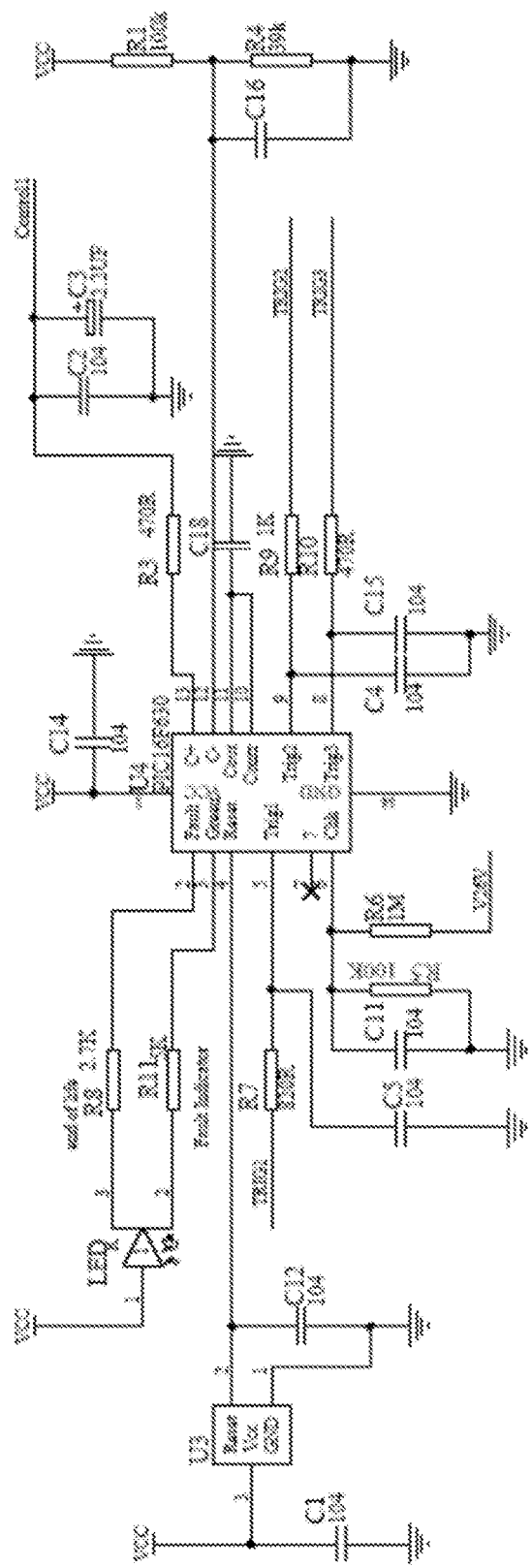
FIG. 5 is a third portion of a circuit diagram of the embodiment of FIG. 3.

As shown in FIGS. 3 and 5, in the present embodiment, the simulation leakage circuit 50 comprises the microcontroller U4_5, a filter capacitor C4_5, a current limiting resistor R9_5, a one-way silicon controlled rectifier SCR2_3, and a current limiting resistor R10_3. One terminal of the filter capacitor C4_5 is grounded, and the other terminal is connected to a signal triggering terminal Trig2 (pin 9) of the microcontroller U4_5. One terminal of the current limiting resistor R9_5 is connected to the signal triggering terminal Trig2 of the microcontroller U4_5, the other terminal is connected to the control electrode of the one-way silicon controlled rectifier SCR2_3. The one-way silicon controlled rectifier SCR2_3 and the limiting resistor R10_3 are connected in series between the live line and the ground. In this way, the anode of the one-way silicon controlled rectifier SCR2_3 receives high voltage. (Alternatively, the cathode of the one-way silicon controlled rectifier SCR2_3 is grounded, or the current limiting resistor R9_5 is grounded). The connection point where the one-way silicon controlled rectifier SCR2_3 and the limiting resistor R10_3, connected in series, are connected to the live line L is located between the position where the live line L passes through a current coupling induction coil T2_3 and reset switch S1_3.

In other embodiments, the simulation leakage circuit 50 may be omitted, and the objectives of the present disclosure may still be achieved.

The reverse connection detection and execution circuit 70 comprises a reverse connection detection control circuit and a detection and execution circuit, which are connected to each other and carry out detecting of reverse connection of the protection circuit in a reset state and in a tripping state.

The leakage detection circuit of the ground fault detection circuit 20 comprises a current coupling induction coil T1_3 and a capacitor C6_3. The capacitor C6_3 is connected to the two terminals of the current coupling induction coil T1_3 to form a filter circuit. The filter circuit is connected to pin 2 and pin 3 of a leakage signal processing IC U5_3 (as described below) of the signal amplifying and shaping circuit. The supply lines of the protection circuit pass through the current coupling induction coil T1_3.

The grounding detection circuit of the ground fault detection circuit 20 comprises a current coupling induction coil T2_3 and a capacitor C3_3. The capacitor C3_3 is connected to the two terminals of the current coupling induction coil T2_3 to form a filter circuit. One terminal of the filter circuit is grounded, and the other terminal is connected to pin 7 of the leakage signal processing IC U5_3 (as described below) of the signal amplifying and shaping circuit. The supply lines of the protection circuit pass through the current coupling induction coil T2_3.

Figure 4:
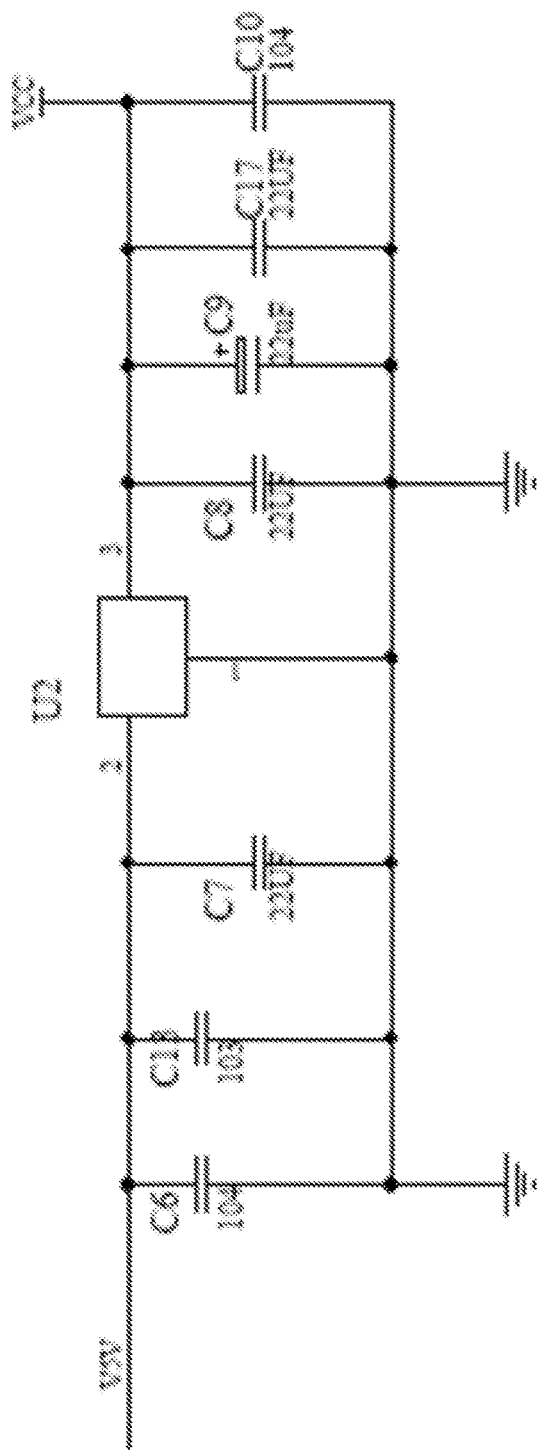
FIG. 4 is a second portion of a circuit diagram of the embodiment of FIG. 3.

As shown in FIGS. 3 and 4, in the present embodiment, the power supply filter circuit of the power supply circuit 90 comprises an inductor coil T3_3. The first filter and regulator circuit comprises a current limiting resistor R5_3, a filter capacitor C4_3, and an internal regulator circuit of pin 6 of the leakage signal processing IC U5_3. As shown, the rectifier circuit DB1_3 is a full bridge rectifier circuit. In other embodiments, a rectifier circuit such as a half-wave rectifier circuit may be used. The two terminals of the current limiting resistor R5_3 are respectively connected to an output terminal pin 3 of the rectifier circuit DB1_3 and pin 6 of the leakage signal processing IC U5_3. The filter capacitor C4_3 is connected between pin 6 of the leakage signal processing IC U5_3 and the ground. The second filter and regulator circuit comprises a current limiting resistor R2_3, a stabilivolt DZ1_3, a filter capacitor C7_3, a filter capacitor C6_4, a filter capacitor C13_4, a filter capacitor C7_4, a power supply IC U2_4, a filter capacitor C8_4, a filter capacitor C9_4, a filter capacitor C17_4, and a filter capacitor C10_4. One terminal of the current limiting resistor R2_3 is connected to pin 3 of the rectifier circuit DB1_3, and the other terminal is connected to pin 2 of the power supply IC U2_4. The positive electrode of the stabilivolt DZ1_3 is grounded, and the negative electrode is connected to pin 2 of the power supply IC U2_4. The filter capacitor C7_3, the filter capacitor C6_4, the filter capacitor C13_4, and the filter capacitor C7_5 each have one terminal grounded, and have the other terminal connected to pin 2 of the power supply IC U2_4. The filter capacitor C8_4, the filter capacitor C9_4, the filter capacitor 17_4, and the filter capacitor C10_4 each have one terminal grounded, and have the other terminal connected to pin 3 of the power supply IC U2_4. Pin 3 of the power supply IC U2_4 is connected to the VCC terminal of the protection circuit, and pin 1 is grounded.

As shown in FIG. 3, in the present embodiment, the leakage detection and signal amplifying circuit of the signal amplifying and shaping circuit 30 comprises: a leakage signal processing IC U5_3, a coupling capacitor C1_3, a negative feedback resistor R4_3, and a coupling capacitor C2_3. The coupling capacitor C1_3, the negative feedback resistor R4_3, and the coupling capacitor C2_3 are sequentially connected in series between the current coupling induction coil T1_3 and the current coupling induction coil T2_3. The two terminals of the negative feedback resistor R4_3 are respectively connected to pin 1 and pin 7 of the leakage signal processing IC U5_3.

As shown in FIG. 5, in the present embodiment, the signal shaping circuit of the signal amplifying and shaping circuit 30 comprises internal comparison shaping circuit of pin 12 of the microcontroller U4_5, a filter capacitor C2_5, a filter capacitor C3_5, a coupling resistor R3_5, a voltage divider resistor R1_5, a voltage divider resistor R4_5, a filter capacitor C16_5, and a filter capacitor C18_5. The filter capacitor C2_5 and the filter capacitor C3_5 are connected in parallel, and then one terminal is grounded, and the other terminal is connected to pin 5 of the leakage signal processing IC U5_3. One terminal of the coupling resistor R3_5 is connected to pin 5 of the leakage signal processing IC U5_3, the other terminal is connected to pin 13 of microcontroller U4_5. The voltage divider resistor R1_5 and the voltage divider resistor R4_5 are sequentially connected in series between the power supply voltage VCC and the ground. The connection point of the voltage divider resistor R1_5 and the voltage divider resistor R4_5 is connected to pin 12 of microcontroller U4_5. The filter capacitor C16_5 and the voltage divider resistor R4_5 are connected in parallel at two terminals, and one terminal of the filter capacitor C18_5 is grounded and the other terminal is connected to pins 10 and 11 of the microcontroller U4_5.

As shown in FIGS. 3 and 5, in the present embodiment, the power supply detection circuit of the power supply detection and indicator circuit 60 comprises a rectifier circuit DB1_3 (which may be a full bridge rectifier circuit), a current limiting resistor R5_3, an internal regulator circuit in pin 6 of the leakage signal processing IC U5_3, a filter capacitor C4_3, a voltage divider resistor R6_5, a voltage divider resistor R5_5, a filter capacitor C11_5, and a microcontroller U4_5. The two terminals of the current limiting resistor R5_3 are respectively connected to the output terminal pin 3 of the rectifier circuit DB1_3 and pin 6 of the leakage signal processing IC U5_3. The filter capacitor C4_3 is connected between pin 6 of the leakage signal processing IC U5_3 and the ground. One terminal of the voltage divider resistor R6_5 is connected to pin 6 of the leakage signal processing IC U5_3, and the other terminal is connected in series to the voltage divider resistor R5_5, which is grounded. The connection point of the voltage divider resistor R6_5 and the voltage divider resistor R5_5 is connected to a detection terminal of the microcontroller U4_5. One terminal of the filter capacitor C_11 is grounded, and the other terminal is connected to the detection terminal (pin 6) of the microcontroller U4_5.

As shown in FIG. 5, in the present embodiment, the indicator circuit of the power supply detection and indicator circuit 60 comprises a normal signal output terminal (pin 3) and an error signal output terminal (pin 2) of the microcontroller U4_5, a current limiting resistor R8_5, a current limiting resistor R11_5, a red LED, and a green LED. The LEDs maybe be contained in a single red and green LED indicator. The current limiting resistor R8_5 is connected between the error signal output terminal (pin 2) of the microcontroller U4_5 and the negative electrode of the red LED. The current limiting resistor R11_5 is connected between the normal signal output terminal (pin 3) of the microcontroller U4_5 and the negative electrode the green light LED. The positive electrodes of both the red LED and the green LED are connected to the VCC terminal of the protection circuit.

As shown in FIGS. 3 and 5, in the present embodiment, the control circuit of the tripping mechanism control circuit 80 comprises a microcontroller U4_5, a filter capacitor C5_5, a current limiting resistor R7_5, a one-way silicon controlled rectifier SCR1_3, a one-way silicon controlled rectifier SCR4_3, a surge absorption capacitor C12_3, a surge absorption resistor R21_3, and a relay T3_3 that interfaces with inductor coil T3_3. (Alternatively, single one-way silicon controlled rectifier SCR1_3 may be included instead of one-way silicon controlled rectifier SCR1_3 and one-way silicon controlled rectifier SCR4_3.) The filter capacitor C5_5 is connected between a triggering signal terminal trig1 (pin 5) of the microcontroller U4_5 and the ground. The current limiting resistor R7_5 is connected between the triggering signal terminal (pin 5) of the microcontroller U4_5 and the control electrodes of both the one-way silicon controlled rectifier SCR1_3 and the one-way silicon controlled rectifier SCR4_3 (or, in alternative embodiments, just the control electrode of the embodiments, one-way silicon controlled rectifier SCR1_3). The anodes of one-way silicon controlled rectifier SCR1_3 and the one-way silicon controlled rectifier SCR4_3 (or, in alternative embodiments, just the anode of one-way silicon controlled rectifier SCR1_3) are connected to the connection point where the coil of the relay T3_3 is connected to the AC input (pin 1) of the rectifier circuit DB1_3. The cathodes of the one-way silicon controlled rectifier SCR1_3 and the one-way silicon controlled rectifier SCR4_3 are grounded. The surge absorption capacitor C12_3 and the surge absorption resistor R21_3 are connected in series between the anode of the one-way silicon controlled rectifier SCR1_3 and the ground. The relay T3_3 drives the reset switch S1_3 into action through a mechanical link. C12_3 and R21_3 have the function of surge absorption, so as to prevent damage to SCR1_3 and SCR4_3 and subsequent circuitry by surge voltage generated when the relay T3_3 is turned off after being switched on, assuring reliable working of the circuit. In a normal state, S1_3 is in a conductive state, assuring that the load circuit properly provides power supply; in an abnormal state, SCR1_3 is switched on, the relay T3_3 is engaged, which turns off the switch S1_3 through a mechanical link and thus disconnects power supply.

As shown in FIGS. 3 and 5, in the present embodiment, the reverse connection detection control circuit of the reverse connection detection and execution circuit 70 comprises a microcontroller U4_5, a filter capacitor C15_5, a triggering current limiting resistor R10_5, and a heavy and light current isolation optocoupler U6_3. The filter capacitor C15_5 is connected between a triggering terminal trig3 (pin 8) and a ground terminal (pin 14) of the microcontroller U4_5. The current limiting resistor R10_5 is connected between the triggering terminal (pin 8) of the microcontroller U4_5 and a triggering control terminal of the heavy and light current isolation optocoupler U6_3. A power supply terminal of the heavy and light current isolation optocoupler U6_3 is connected to the power supply voltage terminal VCC of the protection circuit. A first output terminal of the heavy and light current isolation optocoupler U6_3 is connected to the load output terminal L2 of the live line.

As shown in FIG. 3, in the present embodiment, the detection and execution circuit of the reverse connection detection and execution 70 comprises a surge absorption capacitor C11_3, a surge absorption capacitor C13_3, a normally-closed contact K1_3, a normally-open contact K2_3, a surge absorption resistor R18_3, a normally-closed switch S2_3, and a reverse relay T4_3. In this disclosure, the terms normally-open and normally-closed refer to the initial state of element in the GFCI, for example the state of a new GFCI prior to installation. The surge absorption capacitor C11_3 and the surge absorption capacitor C13_3 are connected in series, and are respectively connected with the normally-closed contact K1_3 and the normally-open contact K2_3 between the first and second output terminals of the heavy and light current isolation optocoupler U6_3. One terminal of the resistor R18_3 is connected to the connection point between surge absorption capacitor C11_3 and surge absorption capacitor C13_3; the other terminal is connected to the load output terminal N2 of the neutral line. The normally-closed switch S2_3 is provided on the live line L and the neutral line N, and is located between the load output terminals L2 and N2 and the reset switch S1_3. The normally-closed switch S2_3 is linked with the normally-open contact K2_3. The reverse relay T4_3 has one control terminal connected to the second output terminal of the heavy and light current isolation optocoupler U6_3 and surge absorption capacitor C11_3, and has the other control terminal connected to the load output terminal N2. The reverse relay T4_3 drives the normally-closed switch S2_3 into action through a mechanical link.

As shown in FIG. 3, in the present embodiment, the power supply circuit 90 is further provided with a piezoresistor RY1_3 and an over-current protection resistor F1_3. The piezoresistor RY1_3 is connected between the input terminal of the live line L and the input terminal of the neutral line N. The over-current protection resistor F1_3 is connected between the input terminal of the live line L and an input terminal of the filter circuit A of the power supply circuit 90.

In other embodiments, piezoresistor RY1_3 and/or the over-current protection resistor F1_3 may be omitted, and the objectives of the present disclosure may still be achieved.

As shown in FIG. 2, the ground fault circuit interrupter 100 (GFCI) of the present disclosure comprises an interrupter body 101. A protection circuit in the interrupter body 101 adopts the protection circuit of the present disclosure as described above (the description of which is omitted here).

The ground fault circuit interrupter 100 (GFCI) of the present disclosure works as follows:

Booting and power-on self-test: When powered on in a reset state (when S1_3 is closed), the microcontroller U4_5 provides a self-test of the GFCI. Specifically, microcontroller U4_5 conducts a two step power-on self-test when it receives a normal power supply at pin 1, a normal reset signal at pin 4, and a normal power supply detection signal at pin 6. If pin 6 of microcontroller U4_5 is not able to detect a normal power supply detection signal, the microcontroller U4_5 will directly output low voltage at pin 2, which powers the red LED to remind the user of the failure of the GFCI and the need of replacement.

The first step of the self-test is automatic reverse connection detection. Upon booting up, pin 8 of U4_5 first will output a low voltage reverse connection automatic detection driving signal for approximately 15 ms, which renders optocoupler U6_3 conductive through C15_5 and R10_5. Then, reverse relay T4_3 is energized through a path from L2 and U6_3 to N2, thereby disconnecting the normally-closed contact S2_3. As a result, L2 and N2 are instantly disconnected from the AC input L and N, de-energizing T4_3, closing opened normally-closed contact S2_3, and energizing L2 and N2, which supply power to the load and T4_3, repeating the cycle. Eventually, after the low voltage reverse connection automatic detection driving signal ceases, optocoupler U6_3 is completely disconnected, deenergizing T4_3, closing S2_3, and assuring normal power supply for the load through L2 and N2. Typically, 1-3 cycles of opening and closing S2_3 due to to energizing and de-energizing may occur in 15 ms.

In the case of reverse connection (e.g., if the municipal electricity is connected to the load output terminals of L2/N2 rather than input terminals of L/N), the energizing of reverse relay T4_3 will close the normally-open contact K2_3 of T4_3. Thus, the reversely connected municipal power supply will supply power to T4_3 through L2/N2 and K2_3, even after the low voltage reverse connection automatic detection driving signal ceases. T4_3 will remain electrically pulled in, keeping contact K2_3 closed, disconnecting input terminals L/N and power socket L1/N1 from L2/N2, and assuring safety of users.

In the second step of the power-on self-test, the microcontroller U4_5 conducts a booting leakage self-test. Pin 9 of U4_5 outputs high voltage for 50 ms, which, after current limiting by R9_5, drives the silicon controlled rectifier SCR2_3 into a conductive state, and simulates leakage from live line L to the ground through R10_3. In a normal working case, the microcontroller U4_5 will receive a high voltage control signal at its pin 13 from the signal amplifying and shaping circuit 30, based on a leakage signal from ground fault detection circuit 20. Then, pin 3 of the microcontroller U4_5 will output a low voltage signal, which powers on the green LED, indicating that the circuit is working properly. However, if pin 13 of the microcontroller U4_5 does not receive the high voltage signal, it means that there is an abnormality in the leakage detection functionality of the GFCI; pin 3 of the microcontroller U4_5 outputs high voltage, and pin 2 outputs low voltage, powering on the red LED to indicate that the circuit has failed and remind users to replace it.

Tripping state automatic reverse connection protection: When in a tripping state, the GFCI detects and protects from as follows. In a tripping state, S1_3 is disconnected and K1_3 is closed. Relay T4_3 is directly connected to L2 via K1_3 and is energized and pulled in, opening normally-closed contact S2_3 and closing normally-open contact K2_3. The opening of S2_3 disconnects input terminals L/N and power socket L1/N1 from L2/N2, assuring safety of users. As long as the reverse connection exists, relay T4_3 is self-locked and remains powered via K1_3. The perpetual self-locking state, where the socket and L/N are not powered, reminds users of the connection error and the need to re-install the GFCI.

Leakage and abnormal grounding protection: When working properly, the GFCI will detect leakage or abnormal grounding, and enter the tripping state as follows. Leakage or abnormal grounding will result in abnormal signals through T1_3 and T2_3, which are filtered through C6_3 and C3_3. After traveling through C1_3 and C2_3, the signals enter pins 1 and 7 of U5_3. The signals are amplified by U5_3, shaped at U4_5, and then sent to pin 13 of the microcontroller U4_5. If it detects a high voltage signal at pin 13, U4_5 will output a high voltage signal of 25 ms at its pin 5, which, after filtering through C5_5 and current limiting by R7_5, triggers the silicon controlled rectifier SCR1_3 into a conductive state. Then, a large current instantly passes through the relay T3_3 to drive the tripping mechanism to be tripped, opening reset button S1_3, disconnecting the load circuit and socket from the power supply, and protecting the circuit and safety of users.

Regular cyclic self-test: After a power-on self-test, the microcontroller U4_5 is set (by the program) to periodically conduct a self-test, for example every 150 minutes. The principle for the self-test is identical to that for the leakage self-test of the second step of the power-on self-test of the microcontrollers U4_5.

In the preceding specification, various preferred embodiments have been described with reference to the accompanying drawings. It will, however, be evident that various other modifications and changes may be made thereto, and additional embodiments may also be implemented, without departing from the broader scope of the invention as set forth in the claims that follow.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

We claim:

1. A protection circuit, comprising:
   a power supply circuit;
   a ground fault detection circuit;
   a signal amplifying and shaping circuit;
   a microcontroller control circuit;
   a power supply detection and indicator circuit;
   a tripping mechanism control circuit; and
   a reverse connection detection and execution circuit, wherein:
   the microcontroller control comprises a microcontroller, a first capacitor, and a reset filter circuit;
   the reset filter circuit comprises a reset IC, a second capacitor, and a nineteenth capacitor;
   a first pin of the reset IC is connected to a VCC terminal of the protection circuit, a second pin of the reset IC is connected to a reset terminal of the microcontroller, and a third pin of the reset IC is grounded;
   the second capacitor is connected between the second and third pins of the reset IC;
   the first capacitor is connected between a power supply terminal of the microcontroller and a ground;
   the nineteenth capacitor is connected between the first pin of the reset IC and the ground;
   the power supply terminal of the microcontroller is connected to the VCC terminal;
   a ground terminal of the microcontroller is grounded;
   the microcontroller control circuit carries out power-on self-test and reset for the protection circuit;
   the ground fault detection circuit comprises a leakage detection circuit and a grounding detection circuit, which detect leakage failure and grounding failure, respectively;
   the signal amplifying and shaping circuit comprises a leakage detection and signal amplifying circuit and a signal shaping circuit, which are connected to each other and carry out amplifying and shaping on a leakage detection signal;
   the power supply detection and indicator circuit comprises a power supply detection circuit and an indicator circuit, which are connected to each other and carry out detection and displaying of a power status;
   the reverse connection detection and execution circuit comprises a reverse connection detection control circuit and a detection and execution circuit, which are connected to each other and carry out detecting of a reverse connection of the protection circuit in a reset state and in a tripping state;
   the power supply circuit comprises a power supply filter circuit, a first rectifier circuit, a first filter and regulator circuit, and a second filter and regulator circuit;
   the tripping mechanism control circuit comprises a reset switch, which is provided on a live line and a neutral line of the protection circuit, and a control circuit that controls the reset switch;
   the first filter and regulator circuit is connected to the ground fault detection circuit;
   the second filter and regulator circuit is connected to the signal amplifying and shaping circuit and the microcontroller control circuit;
   the ground fault detection circuit, the signal amplifying and shaping circuit, and the microcontroller control circuit are connected in sequence;
   the microcontroller control circuit is connected to the power supply detection and indicator circuit and the tripping mechanism control circuit;
   the power supply filter circuit is connected to an input terminal of the live line;
   a first input terminal and a second input terminal of the first rectifier circuit are respectively connected to an input terminal of the neutral line and an output terminal of the power supply filter circuit;
   a first pin of the first rectifier circuit is grounded;
   a second pin of the first rectifier circuit is connected to the both the first filter and regulator circuit and the second filter and regulator circuit;
   the reset switch is positioned on the live line and the neutral line after the grounding detection circuit;
   the power supply filter circuit comprises an inductor coil;
   the first filter and regulator circuit comprises a first resistor, a third capacitor, and an internal regulator circuit of a first pin of a leakage signal processing IC;
   the first resistor is connected between the second pin of the first rectifier circuit and the first pin of the leakage signal processing IC;
   the third capacitor is connected between the first pin of the leakage signal processing IC and the ground;
   the second filter and regulator circuit comprises a second resistor, a stabilivolt, a fourth capacitor, a fifth capacitor, a sixth capacitor, a seventh capacitor, a power supply IC, an eighth capacitor, a ninth capacitor, a tenth capacitor, and an eleventh capacitor;

the second resistor is connected between the second pin of the first rectifier circuit and a first pin of the power supply IC;
a positive electrode of the stabilivolt is grounded;
a negative electrode of the stabilivolt connected to first pin of the power supply IC;
the fourth, fifth, sixth, and seventh capacitors are connected in parallel between the first pin of power supply IC and the ground;
the eighth, ninth, tenth, and eleventh capacitors are connected in parallel between a second pin of the power supply IC and the ground;
the second pin of the power supply IC is connected to the VCC terminal;
and a third pin of the power supply IC is grounded;
the leakage detection circuit comprises a first current coupling induction coil and a twelfth capacitor;
the twelfth capacitor is connected between a first terminal and a second terminal of the first current coupling induction coil;
the first and second terminals of the first current coupling induction coil are connected to the second and third pins of the leakage signal processing IC, respectively;
the live and neutral lines pass through the first current coupling induction coil;
the grounding detection circuit comprises a second current coupling induction coil and a thirteenth capacitor;
the thirteenth capacitor is connected to a first terminal and a second terminal of the second current coupling induction coil;
the first and second terminals of the second current coupling induction coil are grounded and connected to the leakage detection and signal amplifying circuit, respectively;
and
the live and neutral lines pass through the second current coupling induction coil.

2. The protection circuit according to claim 1, wherein:
the leakage detection and signal amplifying circuit comprises the leakage signal processing IC, a fourteenth capacitor, a third resistor, and a fifteenth capacitor;
the fourteenth capacitor, the third resistor, and the fifteenth capacitor are sequentially connected in series between the first current coupling induction coil and the second current coupling induction coil;
the third resistor is connected between a fourth pin and a fifth pin of the leakage signal processing IC;
the signal shaping circuit comprises an internal comparison shaping pin of the microcontroller, a sixteenth capacitor, a seventeenth capacitor, a fourth resistor, a fifth resistor, a sixth resistor, an eighteenth capacitor, and a twentieth capacitor;
the sixteenth and seventeenth capacitors are connected in parallel between the ground and a sixth pin of the leakage signal processing IC;
the fourth resistor is connected between the sixth pin of the leakage signal processing IC and a control signal input terminal of the microcontroller;
the fifth and sixth resistors are sequentially connected in series between the VCC terminal and the ground;
a connection point of the fifth and sixth resistors is connected to the internal comparison shaping pin of the microcontroller;
the eighteenth capacitor and the sixth resistor are connected in parallel between the internal comparison shaping pin of the microcontroller and the ground;
the twentieth capacitor is connected between two pins of the microcontroller and the ground;
the power supply detection circuit includes the first rectifier circuit, the first resistor, the internal regulator circuit, the third capacitor, an eighth resistor, a ninth resistor, a twenty-first capacitor, and the microcontroller;
the eighth resistor is connected between the first pin of the leakage signal processing IC and the ninth resistor, which is grounded;
a connection point of the eighth and ninth resistors is connected to a detection terminal of the microcontroller;
the twenty-first capacitor is connected between the ground and the detection terminal of the microcontroller;
the indicator circuit includes a normal signal output terminal and a fault signal output terminal of the microcontroller, a tenth resistor, an eleventh resistor, a red LED, and a green LED;
the tenth resistor is connected between the fault signal output terminal of the microcontroller and a negative electrode of the red LED;
the eleventh resistor connected between the normal signal output terminal of the microcontroller and a negative electrode of the green LED; and
a positive electrode of the red LED and a positive electrode of the green LED are connected to the VCC terminal.

3. The protection circuit according to claim 2, wherein:
the control circuit of the tripping mechanism control circuit comprises the microcontroller, a twenty-second capacitor, a twelfth resistor, a first one-way silicon controlled rectifier, a twenty-third capacitor, a thirteenth resistor, and a relay that interfaces with the inductor coil;
the twenty-second capacitor is connected between a first triggering terminal of the microcontroller and the ground;
the twelfth resistor is connected between the first triggering terminal of the microcontroller and a control electrode of the first one-way silicon controlled rectifier;
an anode of the first one-way silicon controlled rectifier is connected to a connection point where the inductor coil is connected to the second input terminal of the first rectifier circuit;
a cathode of the first one-way silicon controlled rectifier is grounded;
the twenty-third capacitor and the thirteenth resistor are connected in series between the anode of the first one-way silicon controlled rectifier and the ground;
the relay drives the reset switch through a mechanical link;
the reverse connection detection control circuit comprises the microcontroller, a twenty-fourth capacitor, a fourteenth resistor, and a heavy and light current isolation optocoupler;
the twenty-fourth capacitor is connected between a third triggering terminal of the microcontroller and the ground;
the fourteenth resistor is connected between the third triggering terminal of the microcontroller and a triggering control terminal of the heavy and light current isolation optocoupler;

a power supply terminal of the heavy and light current isolation optocoupler is connected to the VCC terminal;

a first output terminal of the heavy and light current isolation optocoupler is connected to the load output terminal of the live line;

the detection and execution circuit comprises a twenty-fifth capacitor, a twenty-sixth capacitor, a normally-closed contact, a normally-open contact, a seventh resistor, a normally-closed switch, and a reverse relay;

the twenty-fifth capacitor and the twenty-sixth capacitor are connected in series;

the twenty-fifth capacitor is connected with the normally-closed contact, the normally-open contact, a first terminal of the reverse relay, and a second output terminal of the heavy and light current isolation optocoupler;

the twenty-sixth capacitor is connected with the load output terminal of the live line;

the seventh resistor is connected between a connection point between the twenty-fifth and twenty sixth capacitors and a load output terminal of the neutral line;

the normally-closed switch is provided on the live and neutral lines between the load output terminals of the live and neutral lines and the reset switch;

the normally-closed switch is linked with the normally-open contact;

the second terminal of the reverse relay is connected to the load output terminal of the neutral line; and the reverse relay drives the normally-closed switch through a mechanical link.

4. The protection circuit according to claim 3, wherein:
the control circuit of the tripping mechanism control circuit further comprises a third one-way silicon controlled rectifier;
the twelfth resistor is connected between the first triggering terminal of the microcontroller and a control electrode of the third one-way silicon controlled rectifier;
an anode of the third one-way silicon controlled rectifier is connected to the connection point where the inductor coil is connected to of the second input terminal of the first rectifier circuit; and
a cathode of the third one-way silicon controlled rectifier is grounded.

5. The protection circuit according to claim 3, wherein:
the power supply circuit comprises a piezoresistor and an over-current protection resistor;
the piezoresistor is connected between the input terminal of the live line and the input terminal of the neutral line;
the over-current protection resistor is connected between the input terminal of the live line and an input terminal of the power supply filter circuit.

6. The protection circuit according to claim 4, wherein:
the power supply circuit comprises a piezoresistor and an over-current protection resistor;
the piezoresistor is connected between the input terminal of the live line and the input terminal of the neutral line;
the over-current protection resistor is connected between the input terminal of the live line and an input terminal of the power supply filter circuit.

7. The protection circuit according to claim 1, further comprising a simulation leakage circuit, wherein:
the simulation leakage circuit comprises the microcontroller, a twenty-seventh capacitor, a fifteenth resistor, a second one-way silicon controlled rectifier, and a sixteenth resistor;
the twenty-seventh capacitor is connected between ground and a second triggering terminal of the microcontroller;
the fifteenth resistor is connected between the second triggering terminal of the microcontroller and a control electrode of the second one-way silicon controlled rectifier;
the second one-way silicon controlled rectifier and the sixteenth resistor are connected in series between the live line and the ground; and
the sixteenth resistor is connected between an anode of the second one-way silicon controlled rectifier and the live line next to the reset switch.

8. The protection circuit according to claim 2, further comprising a simulation leakage circuit, wherein:
the simulation leakage circuit comprises the microcontroller, a twenty-seventh capacitor, a fifteenth resistor, a second one-way silicon controlled rectifier, and a sixteenth resistor;
the twenty-seventh capacitor is connected between ground and a second triggering terminal of the microcontroller;
the fifteenth resistor is connected between the second triggering terminal of the microcontroller and a control electrode of the second one-way silicon controlled rectifier;
the second one-way silicon controlled rectifier and the sixteenth resistor are connected in series between the live line and the ground; and
the sixteenth resistor is connected between an anode of the second one-way silicon controlled rectifier and the live line next to the reset switch.

9. The protection circuit according to claim 3, further comprising a simulation leakage circuit, wherein:
the simulation leakage circuit comprises the microcontroller, a twenty-seventh capacitor, a fifteenth resistor, a second one-way silicon controlled rectifier, and a sixteenth resistor;
the twenty-seventh capacitor is connected between ground and a second triggering terminal of the microcontroller;
the fifteenth resistor is connected between the second triggering terminal of the microcontroller and a control electrode of the second one-way silicon controlled rectifier;
the second one-way silicon controlled rectifier and the sixteenth resistor are connected in series between the live line and the ground; and
the sixteenth resistor is connected between an anode of the second one-way silicon controlled rectifier and the live line next to the reset switch.

10. The protection circuit according to claim 4, further comprising a simulation leakage circuit, wherein:
the simulation leakage circuit comprises the microcontroller, a twenty-seventh capacitor, a fifteenth resistor, a second one-way silicon controlled rectifier, and a sixteenth resistor;
the twenty-seventh capacitor is connected between ground and a second triggering terminal of the microcontroller;
the fifteenth resistor is connected between the second triggering terminal of the microcontroller and a control electrode of the second one-way silicon controlled rectifier;
the second one-way silicon controlled rectifier and the sixteenth resistor are connected in series between the live line and the ground; and
the sixteenth resistor is connected between an anode of the second one-way silicon controlled rectifier and the live line next to the reset switch.

11. The protection circuit according to claim 5, further comprising a simulation leakage circuit, wherein:
the simulation leakage circuit comprises the microcontroller, a twenty-seventh capacitor, a fifteenth resistor, a second one-way silicon controlled rectifier, and a sixteenth resistor;
the twenty-seventh capacitor is connected between ground and a second triggering terminal of the microcontroller;
the fifteenth resistor is connected between the second triggering terminal of the microcontroller and a control electrode of the second one-way silicon controlled rectifier;
the second one-way silicon controlled rectifier and the sixteenth resistor are connected in series between the live line and the ground; and
the sixteenth resistor is connected between an anode of the second one-way silicon controlled rectifier and the live line next to the reset switch.

12. The protection circuit according to claim 6, further comprising a simulation leakage circuit, wherein:
the simulation leakage circuit comprises the microcontroller, a twenty-seventh capacitor, a fifteenth resistor, a second one-way silicon controlled rectifier, and a sixteenth resistor;
the twenty-seventh capacitor is connected between ground and a second triggering terminal of the microcontroller;
the fifteenth resistor is connected between the second triggering terminal of the microcontroller and a control electrode of the second one-way silicon controlled rectifier;
the second one-way silicon controlled rectifier and the sixteenth resistor are connected in series between the live line and the ground; and
the sixteenth resistor is connected between an anode of the second one-way silicon controlled rectifier and the live line next to the reset switch.

13. A ground fault circuit interrupter, comprising an interrupter body, wherein the interrupter body includes the protection circuit of claim 1.

14. A ground fault circuit interrupter, comprising an interrupter body, wherein the interrupter body includes the protection circuit of claim 3.

15. A ground fault circuit interrupter, comprising an interrupter body, wherein the interrupter body includes the protection circuit of claim 2.

16. A ground fault circuit interrupter, comprising an interrupter body, wherein the interrupter body includes the protection circuit of claim 4.

17. A ground fault circuit interrupter, comprising an interrupter body, wherein the interrupter body includes the protection circuit of claim 5.

18. A ground fault circuit interrupter, comprising an interrupter body, wherein the interrupter body includes the protection circuit of claim 6.

19. A ground fault circuit interrupter, comprising an interrupter body, wherein the interrupter body includes the protection circuit of claim 7.

20. A ground fault circuit interrupter, comprising an interrupter body, wherein the interrupter body includes the protection circuit of claim 8.

* * * * *